Feb. 19, 1957 N. H. SCHWENKLER 2,782,295
READING LIGHT FOR AIRCRAFT
Filed Aug. 31, 1954
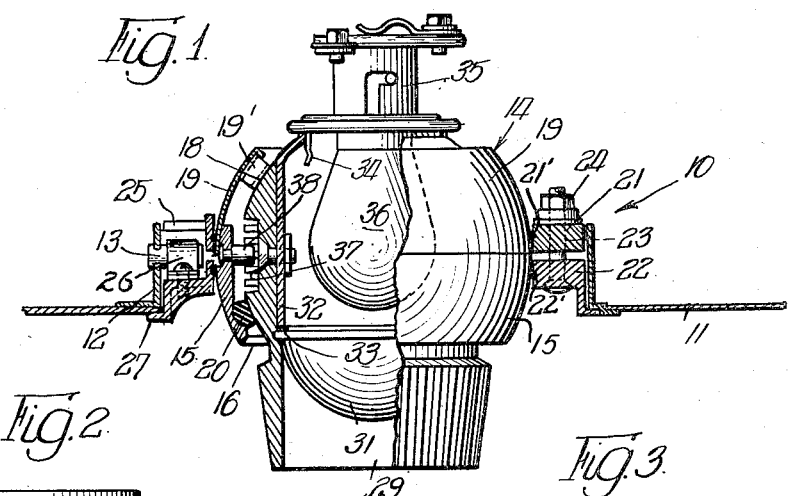
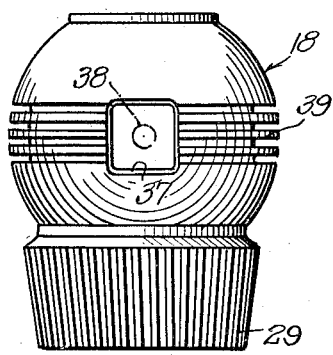
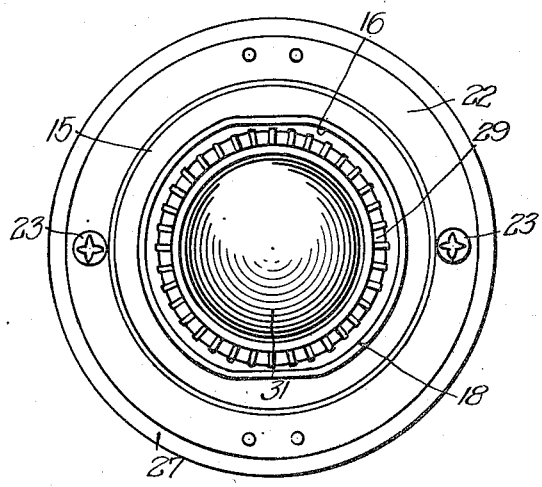
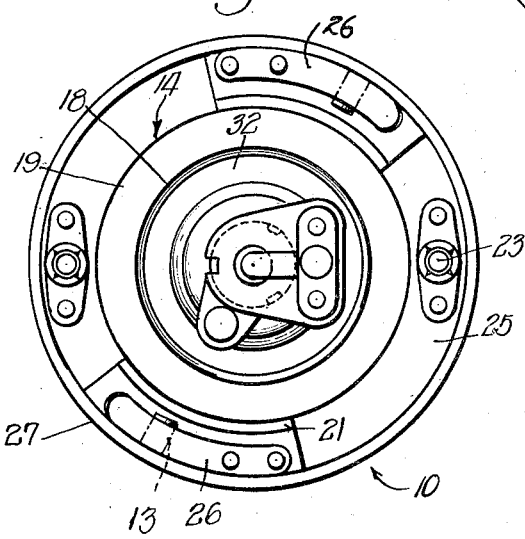
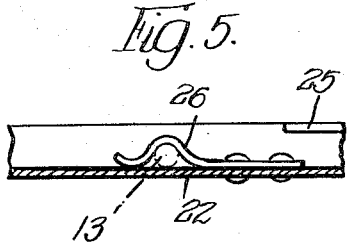
INVENTOR.
Norbert H Schwenkler,
BY
Cromwell, Greist-Warden
ATTYS

United States Patent Office 2,782,295
Patented Feb. 19, 1957

2,782,295

READING LIGHT FOR AIRCRAFT

Norbert H. Schwenkler, Chicago, Ill., assignor to Patent License Corporation, Chicago, Ill., a corporation of Illinois Application August 31, 1954, Serial No. 453,271

8 Claims. (Cl. 240—7.35)

The present invention relates to an improved adjustable reading light, which is particularly devised for installation in passenger aircraft although presenting obvious advantages of related sort for use in other surroundings. This is true in general in reference to passenger carrying vehicles, in which it is desirable to afford a light fixture providing an intensely condensed, well directed reading beam, yet with provisions enabling the passenger to adjust the direction of the beam as desired, usually in accordance with the position of the passenger's body and reading plane. In this regard the fixture of the invention affords a primary adjustability which is of great practical value in the initial installation and focussing thereof and, thereafter, a secondary manual adjustability by a passenger, within limits which will permit to him a desired positioning of a reading beam in relation to his seat, yet without possibility of annoying his fellow passenger due to glare.

It is an object of the invention to provide a fixture of this sort which is relatively simple and inexpensive in construction, which may be easily installed in relation to a passenger space having simple mounting provisions to receive the same. The fixture is characterized by a quasi-spherical external mounting shell which is appropriately adjusted and clamped in place on a suitable supporting surface upon initial installation, as a primary or basic adjustment determined by the seating scheme of an aircraft interior, and by a similar, quasi-spherical, ball-type light housing swivelled in the mounting shell under frictional restraint. This affords a secondary manual adjustment by the passenger to direct a reading beam as desired in relation to the general reading area at the passenger's seat.

In reference to this secondary, ball and socket type of swivelling connection, special provisions are made to limit the range of adjustment in a fore and aft direction, amounting to about 12° of swivelling swing, as well as to impose an even more limited range of transverse adjustment of the ball light housing, i. e., at a right angle to the fore and aft, amounting to, say, 6° of swing.

Upon completion of the appropriate basic adjustment the axis of a median beam of the fixture will center at a median angle in this range, both fore and aft and transverse, so that the secondary adjustment will thereafter enable a passenger to adjust the projected light pattern, sufficiently to suit his individual preference, yet not to an extreme extent likely to cause annoyance to a neighbor, who may be in a reclining posture. The manual adjustment is particularly desirable in the accommodation of tall or short and slender or corpulent individuals in directing the light beam at the desired reading area. An improved condensing lens and lateral beam shield on the light housing go further to eliminate direct viewing of light and glare, and the housing is well sealed for minimum maintenance and continued high efficiency operation.

Considered more specifically, the fixture comprises an external mounting shell having in part the outline of a sphere, which shell is received on either side of its diameter between coaxial adjustable clamping rings. These rings are adapted to be brought toward one another to compress the spherical surface of the shell, thus to clamp the same in fixed position, upon a basic angular adjustment to a median position of the axis of a light beam to emanate from a source, which source is housed by the quasi-spherical, ball-type light housing in the shell, as mentioned above.

The ball light housing is dust sealed in the outer shell immediately to the rear of a forward, outwardly projecting beam shielding sleeve on the housing, and springs engage it under compression at its spherical surface, so that the housing swivels under frictional restraint in the mounting shell.

In addition to the limits imposed on swinging movement of the light housing, as discussed above, suitable further stop provisions prevent other than a limited rotative movement of the ball housing about its axis in the shell, as upon manipulation by the passenger. This prevents twisting of electrical leads to a standard lamp socket with which the fixture is associated by means of a snap-on connection.

Finally the fixture is removable in its entirety and as a unit from its mounting provisions, associated with a suitable surface or panel of an aircraft or other interior in which the fixture is installed. Such surface might be a cabin ceiling, side wall, luggage rack, deck, etc. This involves the use of an appropriate spring friction, bayonet and slot-type of releasable connection, whereby upon rotative manipulation the fixture may be dropped out of its mount for inspection, servicing, etc. It may be replaced with equal ease and speed.

Considered generally, the fixture is styled attractively to blend with the adjacent interior surroundings. In particular, passenger discomfort apt to be occasioned by contact with an excessively heated fixture surface, as in grasping the same for adjustment, is prevented by fabricating the ball housing, or at least the exposed portion thereof, of a heat-resistant non-metallic material.

The foregoing statements are indicative in a general way of the nature of the invention. Other and more specific objects will be apparent to those skilled in the art upon a full understanding of the construction and use of the improved fixture.

A single embodiment of the invention is presented herein for purpose of illustration. It will be appreciated that the invention may be incorporated in other modified forms coming equally within the scope of the appended claims.

In the drawings:

Fig. 1 is a fragmentary view in side elevation, partially broken away and in vertical or axial section through the fixture, illustrating details of structure and relationship of the component parts of the fixture;

Fig. 2 is a view in side elevation of the ball light housing thereof;

Figs. 3 and 4 are, respectively, bottom and top plan views of the fixture depicted in Fig. 1; and Fig. 5 is a side elevational view further illustrating releasable provisions for mounting the fixture in its intended surrounding.

Referring to Fig. 1 of the drawings, it comprehensively shows the improved light fixture 10 as operatively installed in relation to a cabin wall or ceiling, deck or other supporting surface 11 of an aircraft interior or the like. Such surface is preferably provided with an internally extending annular flange member 12 provided with circumferentially spaced, radially inwardly projecting bayonet locking pins 13. These will serve as part of the means, hereinafter further described to releasably mount fixture 10 in a circular opening defined by the flange, or by inwardly extending, flange-like elements which are the equivalent, for the purpose, to a flange.

The reference numeral 14 generally designates an external quasi-spherical mounting shell for the fixture by which an initial, basic focussing adjustment of the same upon installation is made. This shell comprises a lower or forward annular half or ring 15, preferably of a molded plastic such as of Bakelite or the like. It has an external surface of spherical contour, terminating at its lower or outer extremity in an inwardly flanged opening 16 of non-circular contour, as illustrated in Fig. 3.

As there shown, opening 16 is characterized by generally circular opposite end segments diametrically opposed to one another in the fore and aft direction of the aircraft interior, or other vehicular installations, which segments are connected by parallel edge portions, diametrically opposed to one another at a 90° angle to the fore and aft. The thus outlined opening serves as a limit stop for the swivelling adjustment of an internal, ball-type light housing of the fixture, generally designated 18, and to this end opening 16 is so contoured that the fore and aft segments will permit a swing of housing 18 amounting to approximately 12°, whereas the side edges connecting the segments limit transverse swing to approximately 6°. The significance of these limitations has been alluded to.

Outer shell 14 is completed by a further spherical surface mating element 19, preferably in the form of an aluminum stamping, which is externally telescoped over and fixedly secured to lower plastic ring 15. The outer surface of element 19 continues upwardly the spherical contour of ring 15. Adjacent its upper extremity element 19 is provided on its inner surface with a plurality of leaf spring members 19' which bear frictionally against the upper spherical outer surface of ball light housing 18, thus yieldably maintaining the latter in any position to which it is adjusted by a passenger. The lower opening 16 of shell 14 is sealed in relation to the light housing 18 by an annular sealing gasket 20 of impregnated, fungus-proof felt.

A pair of metal mounting and clamping rings 21, 22 coact in clamping the mounting shell 14 of the fixture in an initially adjusted and basically focussed position. These rings have annular internal grooves receiving compressible O-rings 21', 22', respectively which engage the spherical surface of the shell, at either side of its plane of maximum diameter, when they are clamped together and against this surface by screws 23 and coacting nuts 24. Thus in the initial installation, the shell 14 is basically positioned by the installer with the axis of housing 18, in a median position thereof, through the center of shell opening 16. This will line the same up with the reading plane of a passenger's seat beneath or to one side of the fixture, permitting a range of further limited manual adjustment of a projected light beam in accordance with the individual demand or desire of the passenger. So positioned upon installation, screws 23 are taken up to clamp outer shell 14 in permanent position.

The fixture assembly as a whole is releasably mounted in relation to the surface 11 by means of a bayonet-and-slot arrangement best illustrated in Fig. 5 of the drawings, which affords a further function for shell clamping rings 21, 22. To this end the internally disposed flange means 12 on the mounting surface 11 for the fixture preferably carries radial locking pins 13, as described above. The upper clamp ring 21 is provided with opposed arcuate flanges 25 spaced by cut away recesses to accommodate pins or lugs 13, and an elongated leaf spring 26 of special configuration is secured on the upper surface of lower clamp ring 22, being located beneath one of the recesses and extending circumferentially of ring 22. Accordingly, pins 13 may be readily engaged beneath springs 26 in the clearance afforded between flanges 25, following which rotative manipulation of the rings will cause the fixture to be releasably bayonet-and-slot locked in place in its intended setting.

Lower clamp ring 22 may be provided with an annular, externally projecting flange 27 to engage upwardly against the lower surface of the mounting member 11, providing a finished appearance, and serving as a hand piece for engaging and releasing the fixture. To this end an appropriate legend as to the direction of manipulation of the ring to release the fixture may be carried on the under surface of this flange.

Internal ball light housing 18 carries a forwardly or downwardly projecting, sleeve-like light confining shield 29 for manual grasping by the passenger to swivel the housing. As stated above, housing 18 is preferably molded in its entirety from a plastic material such as Bakelite for its low heat conductivity. The housing has a deep plano-convex lens 31 fixedly mounted in its cylindrical bore to the rear of the mouth of shield 29. The lens is held in place by an internal sleeve 32 bearing forwardly against a sealing gasket 33, and an upward, inwardly convergent annular extremity of this sleeve frictionally coacts with the retaining springs 34 of a snap-on type lamp socket 35, thereby releasably securing the fixture as a whole to the socket. The latter is of entirely conventional nature, having the usual provisions to receive an incandescent lamp 36 and energizing leads therefor.

In order to prevent undue twisting of such leads, as will inevitably result from repeated passenger manipulation of ball light housing 18, this housing has an externally disposed, generally rectangular recess 37 in the middle area of its external surface (Fig. 2), while the mounting shell ring 15 is provided with an inwardly projecting pin 38 which extends radially into the recess. Thus, although permitting desired swivelling manipulation of housing 18 in shell 14, the recess and pin arrangement prevents rotation of the housing beyond a limited number of degrees, and thus guards against twisting of the electrical leads to socket 35.

Ball housing 18 may also be provided with fluting 39, primarily to reduce the amount of material required therefor, and projecting shield sleeve 29 is also fluted for grasping. The sleeve and lens 31 severely confine a beam emanating from lamp 36 and the sleeve blends with the appearance of the externally exposed ring 15 of mounting shell 14. The material of these plastic members is preferably chosen to blend harmoniously with the remainder of the interior in which fixed fitting is installed.

I claim:

1. A lighting fixture comprising a lamp housing having a generally spherical outer surface, an external mounting shell in which said housing is adjustably swivelled, said shell presenting a curved outer surface of generally spherical character, coaxial clamp rings frictionally engageable with the spherical surface of said outer shell, and adjustable means securing said clamp rings in clamping and locking engagement with said outer surface of said shell when said shell is positioned in a predetermined angular relation to the axis of said rings, said shell having internal means in engagement with said outer surface of said lamp housing for frictionally restraining the movement of said housing relative to said shell.

2. A lighting fixture comprising a lamp housing having a generally spherical outer surface, an external mounting shell in which said housing is adjustably swivelled, said shell presenting a curved outer surface of generally spherical character with an annular opening of non-circular outline, coaxial clamp rings having inner surface portions frictionally engageable with said outer shell surface, and adjustable means securing said clamp rings in clamping and locking engagement with said outer surface of said shell in a predetermined angular position of the shell relative to the axis of said rings, said shell having frictional movement restraining means in engagement with said outer surface of said lamp housing and said lamp housing having portions extending into said opening and engageable with the edges of said shell which define said opening upon predetermined swivelling movement in relation thereto to limit longitudinal and transverse adjustment of said lamp housing in said shell.

3. A double swivelled light fixture adapted for vehicular installation so as to enable initial angular adjustment thereof upon installation and subsequent manual passenger adjustment, comprising a two part outer annular mounting shelf open at opposite coaxial ends thereof and having a generally spherical external surface intermediate said ends, the opening at one of the ends being of irregular outline, said irregular opening being restricted in width in its transverse direction in relation to the width thereof longitudinally, means to support said shell with the two parts thereto clamped together in an adjusted position, and an internal ball-type swivel housing in said shell, said housing being provided with an external, generally spherical surface frictionally swivelled by said shell for adjustment relative thereto, said housing having an axially extending shielding sleeve projecting externally of said shell and acting to laterally confine a light beam issuing from the housing, said sleeve projecting through said irregular opening and limiting the swivelling adjustment by engagement of said sleeve with the edges of said shell which define said irregular opening.

4. A double swivelled light fixture adapted for vehicular installation so as to enable initial angular adjustment thereof upon installation and subsequent manual passenger adjustment, comprising an outer annular mounting shell open at opposite coaxial ends thereof and having a generally spherical external surface intermediate said ends, one of the end openings being of irregular outline and being restricted in width in its transverse direction in relation to the width thereof longitudinally, means to support said shell in an adjusted position, an internal ball-type swivel housing in said shell, said housing being provided with an external, generally spherical surface frictionally swivelled by said shell for adjustment relative thereto, said housing having an axially extending shielding sleeve projecting externally of said shell and acting to laterally confine a light beam issuing from the housing, said housing having swivelling adjustment between limits determined by engagement of said sleeve with the edges of said shell defining said irregular opening, and coacting stop means carried by said shell and by said housing to limit rotative movement of the latter relative to said shell.

5. A double swivelled light fixture adapted for vehicular installation so as to enable initial angular adjustment thereof upon installation and subsequent manual passenger adjustment, said fixture comprising an outer annular mounting shell open at opposite coaxial ends thereof and having a generally spherical external surface intermediate said ends, one of the end openings being of irregular outline and being restricted in width in its transverse direction in relation to the width thereof longitudinally, means for mounting said shell including a pair of coaxial clamping rings engageable with said external surface and having provision for drawing the same together to frictionally clamp and to hold said shell in an adjusted position, an internal ball-type swivel housing in said shell, said housing being provided with an external, generally spherical surface frictionally swivelled by said shell for adjustment relative to said shell, said housing having an axially extending shielding sleeve projecting externally of said shell and acting to laterally confine a light beam issuing from the housing, said sleeve projecting through said irregular end opening whereby said housing has swivelling adjustment between limits determined by engagement of said sleeve with the edges of said shell which define said irregular shell opening, and coacting stop means carried by said shell and by said housing to limit rotative axial movement of the latter relative to said shell.

6. A double swivelled light fixture adapted for vehicular installation so as to enable initial angular adjustment thereof upon installation and subsequent manual passenger adjustment, said fixture comprising an outer annular mounting shell which is open at opposite coaxial ends thereof and which has a generally spherical external surface intermediate said ends, a pair of coaxial clamping rings frictionally engageable with said external surface and provided with means for drawing the same together to frictionally clamp said shell in an adjusted position relative thereto, an internal ball-type swivel housing positioned in said shell, said housing having an external, generally spherical surface frictionally swivelled by said shell, and means on said shell clamp rings to releasably secure the fixture as a whole on a supporting member.

7. A double swivelled light fixture for vehicular installation which is constructed and installed to enable initial angular adjustment thereof upon installation and subsequent manual passenger adjustment, said fixture comprising an outer annular mounting shell open at opposite coaxial ends thereof and having a generally spherical external surface intermediate said ends, one of the end openings being of irregular outline and being restricted in width in its transverse direction in relation to the width thereof longitudinally, means to clamp said shell in an adjusted position on a support, and an internal ball-type swivel housing in said shell having an external, generally spherical surface frictionally swivelled by said shell, said housing having means adjacent one end thereof for engaging the shell edges defining said irregular opening whereby to limit swivelling movement of said housing relative to said shell, and means at the other end of said housing to releasably engage a snap-on socket.

8. A double swivelled light fixture adapted for vehicular installation so as to enable initial angular adjustment thereof upon installation and subsequent manual passenger adjustment, said fixture comprising a two part outer annular mounting shell which is open at opposite coaxial ends thereof and which has a generally spherical external surface intermediate said ends, one of the end openings being of irregular outline and being restricted in width in its transverse direction in relation to the width thereof longitudinally, a pair of coaxial clamping rings frictionally engageable with the external surface of said mounting shell and spanning the connection between the two parts of said shell, said rings being provided with means for drawing the same together to frictionally clamp the two parts of said shell together and in an adjusted position relative to said rings, an internal ball-type swivel housing positioned in said shell, said housing having an external, generally spherical surface frictionally swivelled by said shell, and said housing having means engaging the edges of said shell which define said irregular opening for limiting swivelling movement of said housing relative to said shell, and means at the inner end of said housing to releasably engage a snap-on socket.

References Cited in the file of this patent
UNITED STATES PATENTS

| Number | Name | Date |
| --- | --- | --- |
| 2,420,362 | Ekleberry | May 13, 1947 |
| 2,536,799 | Divizia | Jan. 2, 1951 |
| 2,554,258 | Lundquist | May 22, 1951 |
| 2,572,825 | Guth | Oct. 23, 1951 |
| 2,593,171 | Morse | Apr. 15, 1952 |